June 14, 1966
P. V. TERRY
3,256,484
HIGH VOLTAGE TEST PROBE CONTAINING A PART GAS, PART LIQUID
DIELECTRIC FLUID UNDER PRESSURE AND HAVING A
TRANSPARENT HOUSING SECTION FOR VIEWING THE
PRESENCE OF THE LIQUID THEREIN
Filed Sept. 10, 1962
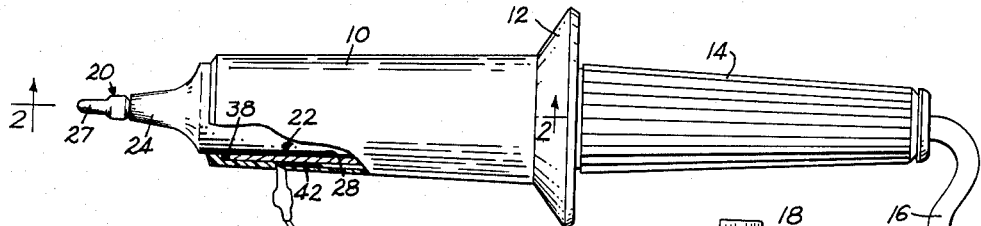
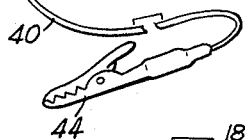
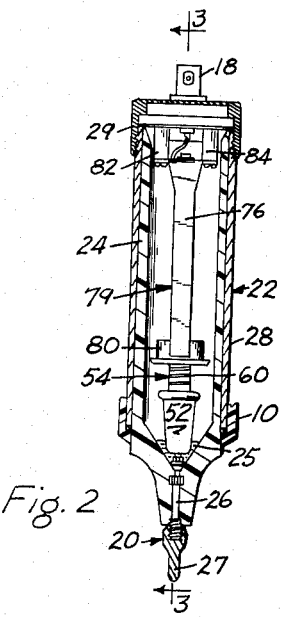
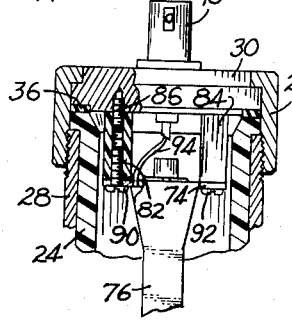
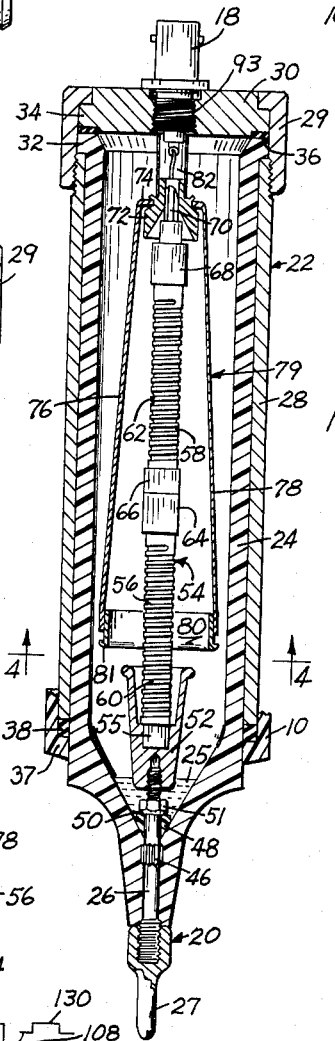
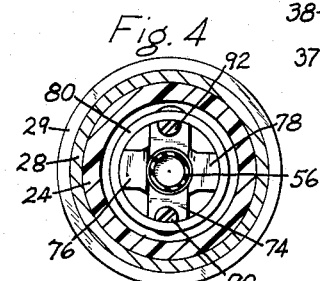
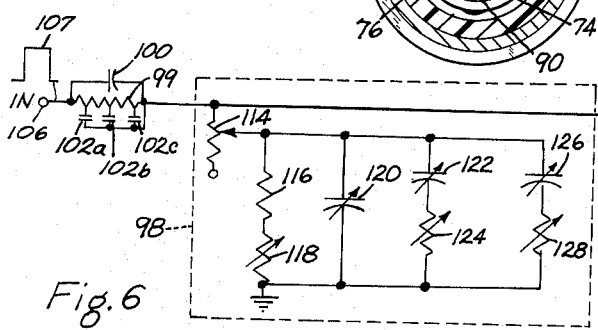
INVENTOR.
PAUL V. TERRY
BY
BUCKHORN, CHEATHAM & BLORE
ATTORNEYS

United States Patent Office 3,256,484
Patented June 14, 1966

3,256,484
HIGH VOLTAGE TEST PROBE CONTAINING A PART GAS, PART LIQUID DIELECTRIC FLUID UNDER PRESSURE AND HAVING A TRANSPARENT HOUSING SECTION FOR VIEWING THE PRESENCE OF THE LIQUID THEREIN
Paul V. Terry, Portland, Oreg., assignor to Tektronix, Inc., Beaverton, Oreg., a corporation of Oregon
Filed Sept. 10, 1962, Ser. No. 222,452
8 Claims. (Cl. 324—72.5)

The subject matter of the present invention relates generally to electrical probes for testing electrical circuits and other apparatus, and in particular to a probe, capable of measuring high voltage signals over a wide range of frequencies, which contains an insulating fluid, at least a portion of which is liquid, so that such fluid serves both as a dielectric material to insulate the inner conductor from the outer conductor of such probe, and as an indicator material to show the presence of such dielectric material.

The electrical probe of the present invention is especially useful when employed as a high voltage probe for a cathode ray oscilloscope to transmit high voltage signals from the circuit under test to the input terminal of such oscilloscope. This probe has several advantages over conventional probes including the fact that it uses an insulating fluid which is at least partially liquid as the dielectric material within such probe thereby visually indicating the presence of such dielectric. This dielectric fluid has a greater dielectric strength than air which allows the probe of the present invention to be constructed of a substantially smaller size than conventional probes containing air. The present probe also has another advantage over previous probes employing a high vacuum for insulation in that it is of a more simple construction and is less expensive to manufacture.

In addition a bell-shaped shield member is provided around the front end of a resistor assembly connected to the inner conductor inside the probe in order to prevent a large amount of current from flowing through the first portion of such resistor to charge the capacitance formed between the resistor and the outer conductor of such probe which would ordinarily tend to destroy such resistor. A further advantage of the probe of the present invention is the employment of a capacitor assembly whose capacitance varies with distance along the resistor assembly by using such resistor assembly as one plate of the capacitors. This capacitor assembly along with a frequency compensation circuit provides such probe with a frequency response of D.C. to about 70 megacycles per second and a rise time for such probe and compensation circuit of approximately 3.3 nanoseconds. Still another advantage of the probe of the present invention is that it employs a dielectric fluid that has a saturation vapor pressure of about two atmospheres at room temperature which makes filling the fluid container in such probe easy. Also the dielectric fluid has a further advantage in that it transmits heat away from the resistor assembly faster than a vacuum would.

It is therefore one object of the present invention to provide an improved electrical probe of simple and inexpensive construction.

Another object of the present invention is to provide an improved electrical probe in which a dielectric fluid is employed to insulate conductive members in such probe and in which such dielectric fluid is at least partially liquid to indicate the presence of such dielectric fluid in such probe.

A further object of the invention is to provide an improved electrical probe in which a dielectric fluid having a greater dielectric strength than air is employed to reduce the size of such probe.

Still another object of the invention is to provide an improved electrical probe in which a shield member is employed around the front portion of a resistor element connected to the inner conductor of such probe in order to prevent the destruction of such resistor due to a large current flow through such front portion of such resistor.

A still further object of the invention is to provide an improved electrical probe apparatus in which a resistor assembly and capacitor assembly are employed within such probe along with an external compensation circuit in order to provide such probe apparatus with a wide range of frequency response and a fast rise time.

Additional objects and advantages of the present invention will be apparent in the following detailed description of a preferred embodiment thereof and in the attached drawings of which:

FIG. 1 is a side view of the preferred embodiment of the electrical probe of the present invention;

FIG. 2 is a partial horizontal sectional view taken along the line 2—2 of FIG. 1;

FIG. 3 is a partial vertical sectional view taken along the line 3—3 of FIG. 2;

FIG. 4 is a horizontal sectional view taken along the line 4—4 of FIG. 3;

FIG. 5 is an enlarged view of a portion of FIG. 2 with parts broken away for clarity; and FIG. 6 is a schematic diagram of an electrical compensation circuit which may be connected to the output of the probe of FIGS. 1 through 5 to provide such probe with a wider frequency response.

One embodiment of the electrical probe of the present invention is shown in FIG. 1 to include a probe housing 10 of polystyrene or other suitable plastic material, including an outwardly extending flange portion 12 which functions as an arcing shield. The housing may be provided with a handle 14 which screws into the flange portion 12. The handle 14 of the housing is hollow and is provided with openings in the front and rear of such handle to accommodate a coaxial cable 16 which extends to and is connected to a coaxial cable connector 18 within the housing. This connector has its inner conductor connected to a probe inner conductor 20 and its outer portion supported by a tubular outer conductor 22 surrounding such inner conductor, as shown in FIG. 3. The probe also includes a tubular container member 24 of circular cross section made of light transparent insulating material, such as a modified polystyrene sold by the Wm. Brand-Rex Division of American Enka Corporation in Concord, Massachusetts under the trademark "Rexolite," or any other suitable plastic material which has a high dielectric strength, is light transparent, has sufficiently high melting point and is not attacked by the dielectric fluid employed within such container member. It has been found that this material can be penetrated by water which passes through the walls of the container member by osmosis. This can cause failure when the probe is used in an extremely humid atmosphere, but can be corrected by storing the probe in a box containing a dehumidifier.

The preferred embodiment of the present invention employs a dielectric fluid sold under the trademark "Freon 114" which is 1,2-dichloro-1,1,2,2-tetrafluoroethane having the chemical formula of $ClCF_2CClF_2$. The dielectric strength of "Freon 114" is about 2.8 times that of air. This dielectric fluid has a boiling point of +4.1 degrees centigrade so that it is normally a gas at room temperature and atmospheric pressure. In order for part of the "Freon 114" dielectric fluid to be in the form of liquid within the probe, a sufficient amount of the liquid is placed inside the fluid-tight container, formed by container member 24 and outer conductor 22 so that a small amount 25 of liquid remains in contact with the Freon vapor filling the remainder of the container. This will give the container a pressure of approximately two atmospheres at a room temperature of 75° F. since that is the vapor pressure of "Freon 114" at 75° F. Thus if enough liquid "Freon 114" is introduced into the container, part of the dielectric fluid exists as a gas while another portion remains in liquid form to serve as an indicator for the presence of dielectric fluid and as a source for dielectric gas in case of any leakage. The container employed for the dielectric fluid has a light transparent portion so that the liquid portion 25 of such dielectric fluid can be observed through such container by the operator before and during testing to eliminate the possibility of failure of the probe due to absence of dielectric fluid and possible injury to the operator. Another important feature of the present invention is that only a small amount of liquid "Freon 114" is allowed to remain in the probe at room temperature so that additional heating will not cause excessive pressures to build up within the probe which could cause a failure. For example, if the probe is filled properly, all of the liquid dielectric will be evaporated when the temperature reaches 118° F. The temperature rise from 75° F. to 118° F. increases the pressure rapidy from two atmospheres to about three atmospheres. However, above 118° F. further increases in temperature result in only very small increases in pressure due to the fact that the dielectric fluid is now entirely a gas. This is a safety feature which eliminates the danger of failure due to heating.

Other insulating materials than plastic may be employed for the container member 24, such as glass or ceramic. However, if they are not light transparent, the container member should be provided with a light transparent insert which serves as a "window" to enable viewing the dielectric liquid 25. The container member 24 is tapered at its front end to provide a point of solid plastic material having a restricted opening through which an inner conductor rod 26 of stainless steel or other suitable metal extends from the exterior of such container member to the interior thereof. A hermetic seal is provided between the conductor rod and the container member in a manner hereafter described. The exterior end of the inner conductor rod 26 is screw threaded into a probe tip 27 which also forms part of inner conductor 20. The outer conductor 22 includes a cylindrical sleeve member 28 of aluminum or other suitable metal whose inner diameter is slightly greater than the outer diameter of the container member 24 so that such sleeve member may be positioned around such container member coaxially therewith. The rear end of the sleeve member 28 is externally threaded to engage an internally threaded cap member 29 of similar material having an aperture in the bottom thereof of a proper diameter to accommodate an annular disc-shaped base member 30. Thus the sleeve member 26, cap member 29 and base member 30 form the outer conductor 22.

In order to form a hermetic seal with the outer conductor, container member 24 is provided with an outwardly extending flange portion 32 at the rear end thereof having an unrestricted opening therein, as shown in FIG. 3. The base member 30 is also provided with an outward extending flange portion 34 having an outer diameter corresponding with that of flange portion 32 and the inner diameter of cap 29. An annular sealing ring 36 of neoprene synthetic rubber material is clamped between the flange portions 32 and 34 to provide the hermetic seal between the outer conductor and the container member when the cap member 29 is screwed onto the sleeve member 28. Thus the bottom of the cap member 29 engages flange 34 while the threaded end of sleeve member 28 engages flange 32 to urge the base member 30 toward the container member 24 compressing the sealing ring 36 to form a gas tight container for the dielectric fluid which is poured through the unrestricted opening in such container member before the cap member is screwed onto the sleeve member.

The housing 10 surrounding the outer conductor 22 is provided with an inwardly extending flange portion 37 on the front end thereof, as shown in FIG. 1 which engages a cushion ring 38 of neoprene or other suitable resilient material which is compressed by the flange portion when the handle 14 is screwed into the housing up against the rear surface of base member 30 in order to secure the outer conductor 22 to the probe housing. This prevents arcing from the probe tip 27 to the sleeve member 28 along the outer surface of the container member. The outer conductor 22 is provided with a ground lead 40 which is connected at one end by means of a spring contact 42 to the outer surface of sleeve member 28 through an opening in the housing 10. The other end of the ground lead 40 may be provided with an alligator clip connector 44 which may be secured to the chassis of the instrument under test or any other convenient ground point.

As shown in FIG. 3, the inner conductor rod 26 is held in place by a knurled portion 46 on such inner conductor rod which engages the container member 24 inside the restricted opening through the front end of such member. A sealing sleeve 48 of polytetrafluoroethylene plastic sold under the trademark "Teflon," fits over the inner conductor rod 26 and is tapered at its front end to conform to the inner surface of the container member 24 at the front end of the cavity therein. The sealing sleeve 48 is held in engagement with the container member and the rod 26 by a washer 50 and a nut 51 which is screw threaded on the rear end of the conductor rod over such washer. A bell-shaped shield member 52 is also secured to the threaded rear end of the inner conductor rod 26 over the nut 51. The shield member is made of brass or other suitable metal provided with a smooth polished surface having rounded corners to prevent arcing between it and other conductive members, and may be provided with a coating of gold to prevent such shield member from being attacked by the Freon 114 dielectric fluid within the container member. A resistor assembly 54 is suitably secured at its front end terminal 55 inside the shield member 52 so that it is electrically connected to the inner conductor 20 including probe tip 26. This resistor assembly may take the form of a pair of hollow ceramic cylinders 56 and 58 which are coated on their outer surfaces with a resistive material, such as tin oxide to provide helical resistance elements 60 and 62, respectively. The resistance elements may be formed in a conventional manner, such as by first coating the entire outer surface of the ceramic cylinders with a continuous coating of tin oxide and then cutting a helical notch through such tin oxide coating into the ceramic. In order to prevent destruction of the helical resistance element 60 because of too large a current flow through the first few turns of the helix, due to charging of the capacitance between the turns and the grounded outer conductor sleeve 28, the shield member 52 is positioned around such first turns. This prevents charging current from flowing between such first turns and the outer conductor, and results in the first portion of the helix within the shield acting as a current limiting resistance for the charging current flowing from the remaining turns to such outer conductor. This prevents thermal destruction of the resistance element 60, which might otherwise occur because of the large charging current produced by high frequency input signals.

The resistance elements 60 and 62 are connected in series by terminal members 64 and 66 suitably secured to the rear and front ends, respectively, of the ceramic cylinders 56 and 58 in contact with a portion of the resistance elements. The terminal members 64 and 66 may be in the form of two cylindrical cups of brass or other suitable metal with terminal member 64 having an internally threaded hole in the bottom of the cup, while the terminal member 66 is provided with an externally threaded portion of reduced diameter extending outward from the bottom of the cup which is threaded into such hole. Another terminal member 68 is suitably secured to the rear end of the ceramic cylinder 58 and is soldered to a banana plug connector 70 which extends coaxially with such cylinder. The banana plug 70 is received into a funnel shaped hole in a socket 72 which is suitably secured to a metal support plate 74 so that the entire resistance assembly 54 is supported coaxially with respect to the container member 24.

The support plate 74 includes a pair of forwardly extending arm portions 76 and 78 which are in the shape of flat metal strips of generally rectangular shape. These arm portions each form a capacitance with the resistance elements 60 and 62. The front ends of arm portions 76 and 78 are spot welded or soldered to an annular ring member 80 which surrounds the resistance coated cylinder 56 and is spaced rearwardly from the shield member 52 to form a capacitance with such shield member, as well as one with resistance element 60. The ring member 80 may be provided with a smooth polished annular outwardly extending flange 81 on the front end thereof in order to prevent arcing between it and the shield member 52. It should be noted that the arm portions 76 and 78 are spaced from the resistance elements 60 and 62 by an amount which increases with distance along such resistance elements from the terminal member 68 to the shield member 52. Thus the capacitance between the resistance element and the arm portion decreases with such distance.

The support plate 74 is secured to the base member 30 by means of a pair of internally threaded spacer sleeves 82 and 84 of insulating material which are attached to such base member by two set screws including set screw 86 and are attached to the support plate by screws 90 and 92, respectively. These screws 90 and 92 are spaced from the set screws to insulate each support plate from such base member. Thus, the capacitor assembly 79 including arm portions 76 and 78 and ring 80, is at the same potential as the end terminal 68 of the resistor assembly 54, and are not connected to the ground potential of the outer conductor including base member 30. The coaxial cable connector 18 may be a BNC type connector which is screw threaded into an opening through the center of base member 30 so that the outer shield conductor 93 of such connector forms a hermetic seal with such base member and electrically connected to the outer conductor 22. The central conductor 94 of the coaxial connector 18 may be soldered in an opening in the support plate 74 in order to connect the end terminal 68 of the resistor assembly to such central conductor through plug 70 and socket 72. This allows input signals applied to the probe tip 27 to be transmitted through the resistor assembly and the capacitor assembly to the central conductor 94 of the connector so that they emerge as output signals from the probe on the central conductor of coaxial cable 16.

If Freon 114 is employed as the dielectric fluid in the probe, it is a relatively simple matter to fill the container member 24 with dielectric fluid because Freon 114 is available commercially in liquid form in pressurized cans. Thus, it is only necessary to fill the container member 24 with the correct amount of liquid Freon 114 by dispensing it from the can in order to remove the air in such container member before the cap member 28 is screwed onto the sleeve member 26 to form a gas-tight container. The correct amount of liquid dielectric 25 for the preferred embodiment of the present invention is measured by pointing the probe downward and filling the container member 24 until the liquid level is slightly above the small end of the shield member 52. As previously discussed, this liquid dielectric serves as a reservoir for the gas dielectric within the container and also as an indicator for the presence of the dielectric fluid since it can be viewed through the pointed end of the container member. It should be noted that too much liquid 25 must not be employed because it may change the value of the capacitance in such probe since such liquid has a different dielectric constant than the gas dielectric and, also, there is a possibility of failure due to increased pressure if all of the liquid Freon 114 is not converted into gas rather quickly at elevated temperatures above normal room temperature of 75° F. For the amount of liquid shown the pressure inside the container member 24 follows the saturated vapor curve from two atmospheres at 75° F. up to about three atmospheres at 118° F. due to heating. At that point all of the liquid should be evaporated and the pressure no longer increases at such a rapid manner, but rises slowly with absolute temperature in accordance with Charles' law for the expansion of gasses within a constant volume. When the probe is to be employed in an environmental temperature less than 10° C., dichlorodifluoromethane ($CCl_2F_2$) sold under the trademark "Freon 12," may be employed as the dielectric fluid because below that temperature the dielectric strength of "Freon 114" decreases below the minimum desired value due to the lowered pressure.

The electrical probe of FIGS. 1 to 5 may be connected to a frequency compensation attenuator circuit 98 shown within the dashed line box of FIG. 6 in order to provide an extremely wide frequency response from D.C. to 70 megacycles per second and a rise time of approximately 3.3 nanoseconds for the combination of a probe and a compensator circuit. As shown in FIG. 6, the probe of the present invention, is represented by a resistor 99 for the resistor assembly 54, a capacitor 100 for the capacitance between the shield member 52 and the annular ring 80 which is connected in parallel with such resistance assembly, and a plurality of different capacitances 102A, 102B and 102C which are connected in parallel with different portions of the resistor 99 and represent the capacitance between the resistor elements 60 and 62 and the arm portions 76 and 78. The schematic diagram for the probe should also include a capacitance which represents the capacitance between the grounded outer conductor 22 and the conducting elements within the container member 24. However this capacitance to ground has not been shown for the sake of simplicity. An input terminal 106 which may be probe tip 27 transmits the input signal 107 through the probe and the compensation circuit to an output terminal 108 which may be connected to the input of a cathode ray oscilloscope. The oscilloscope input impedance is represented by an input resistor 110 connected to ground in parallel with an input capacitor 112.

The compensation circuit 98 includes a peaking potentiometer 114 connected at one end terminal to the output of the probe resistor 99 and by its movable contact to ground through a fixed resistor 116 and a variable resistor 118 which may be employed for D.C. signal compensation. A variable capacitor 120 is connected in parallel with the resistors 116 and 118 to compensate for the effect of the probe capacitance 100. In order to A.C. compensate for the effect of the distributed capacitance 102A, 102B and 102C, a first impedance, including a first variable capacitor 122 connected in series with a first variable resistor 124, is connected in parallel with the resistors 116 and 118, along with a second impedance including a second variable capacitor 126 connected in series with a second variable resistor 218. After being properly attenuated by the circuit containing elements 99 through 128, the signal is transmitted to the output terminal 108 as an output signal 130 having substantially the same waveform as the input signal, but of a lower voltage. Thus, for an attenuation ratio of 1000 to 1, an input signal of 10,000 volts will be transmitted as an output signal of 10 volts. In order to achieve this attenuation with a frequency response which is essentially flat from D.C. to about 70 megacycles, when the probe resistor 99 is 100 megohms, and the input resistor 110 is 1 megohm and the input capacitor 112 is from 10 to 47 picofarads, the following impedance values were employed: potentiometer 114=500 ohms, resistor 116=100 kilohms, resistor 118= 20 kilohms, resistors 124 and 128 each=2.5 megohms variable on a 10% log scale, capacitors 120 and 122 are variable from 9 to 180 picofarads, and capacitor 126 is variable from 90 to 480 picofarads.

The preferred embodiment of the electrical probe shown in FIGS. 1 to 5 has a voltage rating of 40 kilovolts maximum peak A.C. or pulse. The voltage rating for continuous D.C. is 20 kilovolts maximum at 25° C. The voltage rating decreases at frequencies above 100 kilocycles or in environmental temperatures above 25° C. Thus, the peak to peak voltage rating at 1 megacycle per second is about 31 kilovolts while the peak to peak voltage rating at 10 megacycles per second is about 13 kilovolts at 25° C.

It will be obvious to those having ordinary skill in the art that the various changes may be made in the details of the above described preferred embodiment of the present invention without departing from the spirit of the invention. For example, dielectric fluids other than the Freon 114 may be used including those which are liquid at room temperature and atmospheric pressure, such as oil. Therefore, the scope of the present invention should only be determined by the following claims.

I claim:

1. An electrical probe, comprising:
a hollow container member of electrical insulating material having a light transparent portion;
probe tip member of electrical conducting material extending through a fluid-tight seal in said container member from the outside to the inside of said container member;
a tubular shield member of electrical conducting material positioned around said container member except for said transparent portion to allow observation of the interior of said container member through said transparent portion, and insulated from said probe member by said container member;
an impedance including a resistance and a capacitance supported inside said container member and having the input end of said resistance connected to said probe tip member inside said container member, said capacitance being formed by at least one capacitor terminal member extending along said resistance so that the spacing between said terminal member and said resistance decreases with distance from the input end to the output end of said resistance to provide a capacitance which increases with said distance;
a transmission line connector including an outer conductor connected to said shield member and an inner conductor connected to the output end of said resistance; and
a quantity of dielectric fluid in said container, said fluid being at least partially liquid at normal temperature and pressure to indicate the presence of dielectric fluid in said container member.

2. An electrical testing probe, comprising:
a hollow container member of electrical insulating material having a light transparent window portion;
a probe tip conductor of electrical conducting material extending through a hermetic seal in an end portion of said container member from the outside to the inside of said container member;
a shield conductor of electrical conducting material positioned around said container member except for said window portion to allow observation of the interior of said container member through said window portion, and insulated from said probe tip conductor by said container member;
an impedance element including a resistance and a capacitance supported inside said container member and having the input end of said resistance connected to said probe tip conductor inside said container member, said capacitance being formed by at least one capacitor terminal member connected to the output end of the resistance and extending along said resistance so that the spacing between said terminal member and said resistance decreases with distance from the input end to the output end of said resistance to provide a capacitance which increases with said distance;
transmission line connector means including an inner conductor connected to the output end of said resistance through said container to the exterior of said container member and an outer conductor connected to said shield conductor; and
a charge of dielectric fluid in said container, said fluid being under a pressure greater than one atmosphere and being partially gas and partially liquid at normal temperature and pressure to indicate the presence of dielectric fluid in said container.

3. An electrical testing probe, comprising:
a hollow container member of electrical insulating material having a light transparent end portion;
an inner conductor rod of electrical conducting material extending through a gas-tight seal in said container member from the outside to the inside of said container member;
a probe tip secured to said inner conductor rod outside said container member;
a tubular outer conductor of electrical conducting material positioned around said container member except for said end portion to allow observation of the interior of said container member through said end portion, and to form a gas-tight container with said container member;
an impedance element including a resistance and a capacitance supported inside said container having an input terminal electrically connected to said inner conductor rod inside said container, said capacitance being formed by at least one capacitor terminal member connected to the output end of said resistance and extending along said resistance so that the spacing between said terminal member and said resistance decreases with distance from the input end to the output end of said resistance to provide a capacitance which increases with said distance;
coaxial cable connector means having an inner signal conductor connecting the output terminal of said impedance element through said outer conductor to the exterior of said container member in insulated relationship to said outer conductor; and
a charge of dielectric fluid in said container, said fluid being under a pressure greater than one atmosphere and being partially gas and partially liquid at normal temperature and pressure to indicate the presence of dielectric fluid in said container.

4. An electrical probe, comprising:
a hollow container member of electrical insulating material;
probe tip member of electrical conducting material extending through a fluid-tight seal in said container member from the outside to the inside of said container member;
a tubular shield member of electrical conducting material positioned around said container member and electrically insulated from said probe tip member by said container member;
an impedance including a resistance and a capacitance supported inside said container member with said resistance having its input end connected to said probe tip member, said capacitance being formed by a pair of capacitor terminal members positioned on opposite sides of the resistance and extending along said resistance so that the spacing between said terminal members and said resistance decreases with distance from the input end to the output end of said resistance to provide a capacitance which increases with said distance; and
a transmission line connector including a signal conductor connected to the output end of said resistance and a shield conductor connected to said shield member.

5. An electrical probe, comprising:
a tubular container member of light transparent insulating material having a restricted opening in the front end portion and an unrestricted opening in the rear end portion of said container member;
an inner conductor rod secured in said restricted opening to form a gas-tight seal with said container member, and extending from the exterior to the interior of said container member;
a probe tip of conducting material secured to the exterior end of said inner conductor;
a resistance element supported inside said container member with one end of said element secured to the interior end of said inner conductor in electrical contact with said probe tip;
a tubular outer conductor supported around said container member except for a window portion of said container member to allow visual observation of the interior of said container member through said window portion, said outer conductor having a sealing portion which makes a gas-tight seal with the rear end of said container member to close said unrestricted opening and to form a gas-tight container with said container member;
a support member attached to said sealing portion of said outer conductor inside said container to support the other end of said resistance element in insulated relationship to said outer conductor;
transmission line connector means for connecting said other end of said resistance element to the outside of said container in insulated relationship to said outer conductor;
a tubular arcing shield positioned around said one end of said resistance element inside the front end of said container member; and
a charge of dielectric fluid in said container, said fluid being under pressure greater than atmospheric pressure so that a portion of said fluid is a gas and another portion is a liquid at normal temperature and pressure to indicate the presence of dielectric fluid in said container.

6. An electrical probe, comprising:
a tubular container member of light transparent insulating material having a restricted opening in the front end portion and an unrestricted opening in the rear end of portion of said container member;
an inner conductor rod secured in said restricted opening to form a gas-tight seal with said container member, and extending from the exterior to the interior of said container member;
a probe tip of conducting material secured to the exterior end of said inner conductor;
a resistance element supported inside said container member with one end of said element secured to the interior end of said inner conductor in electrical contact with said probe tip;
a tubular outer conductor supported around said cotainer member except for said front end portion to allow visual observation of the interior of said container member through said front end portion, said outer conductor having a sealing portion which makes a gas-tight seal with the rear end of said container member to close said unrestricted opening and to form a gas-tight container with said container member;
a support member attached to said sealing portion of said outer conductor inside said container to support the other end of said resistance element in insulated relationship to said outer conductor;
transmission line connector means for connecting said other end of said resistance element through said sealing portion to the outside of said container in insulated relationship to said outer conductor;
a tubular arcing shield positioned around said one end of said resistance element inside the front end of said container member;
a capacitance element, including an annular metal ring supported around and spaced from said resistance element by a pair of metal strips which are secured at one end to said ring and at their other end to said support member and extend along opposite sides of said resistance element with the spacing between said resistance element and said strips decreasing with distance from said ring to said support member so that the capacitance between said element and said strips increases with said distance; and
a charge of dielectric fluid in said container, said fluid being under pressure greater than atmospheric pressure so that a portion of said fluid is a gas and another portion is a liquid at normal temperature and pressure to indicate the presence of dielectric fluid in said container.

7. An electrical probe, comprising:
a tubular container member of light transparent insulating material having a circular cross section with a restricted opening in the front end portion and an unrestricted opening in the rear end portion of said container member;
a signal conductor rod secured in said restricted opening to form a hermetic seal with said container member, and extending coaxially from the exterior to the interior of said container member;
a probe tip of conducting material secured to the exterior end of said signal conductor;
a resistance element coaxially supported inside said container member with one end of said element secured to the interior end of said signal conductor in electrical contact with said probe tip;
a tubular shield conductor of circular cross section coaxially supported around said container member except for said front end portion to allow visual observation of the interior of said container member through said front end portion, said shield conductor having a cap portion which makes a hermetic seal with the rear end of said container member to close said unrestricted opening and to form a gas-tight container with said container member;
means for connecting said shield conductor to an electrical ground;
a support member attached to said cap portion of said shield conductor inside said container to support the other end of said resistance element in spaced, insulated relationship to said shield conductor;
a coaxial cable connector secured through a hermetic seal in said cap portion, including an outer conductor connected to said shield conductor and an inner conductor connected to said other end of said resistance element;
a tubular arcing shield positioned around said one end of said resistance element inside the front end of said container member;
a capacitance element, including an annular metal ring supported around said resistance element by a pair of metal strips which are secured at one end to said ring and at their other end to said support member and extend along opposite sides of said resistance element with the spacing between said resistance element and said strips decreasing with distance from said ring to said support member so that the capacitance between said element and said strips increases with said distance; and
a charge of dielectric fluid in said container, said fluid being under pressure greater than atmospheric pressure so that a portion of said fluid is a gas and another portion is a liquid at normal temperature and pressure to indicate the presence of dielectric fluid in said container.

8. An electrical probe apparatus, comprising:

a tubular container member of light transparent insulating material having a restricted opening in the front end portion and an unrestricted opening in the rear end portion of said container member;

a signal conductor rod secured in said restricted opening to form a gas-tight seal with said container member, and extending from the exterior to the interior of said container member;

a probe tip of conducting material secured to the exterior end of said signal conductor;

a resistance element supported inside said container member with one end of said element secured to the interior end of said signal conductor in electrical contact with said probe tip;

a tubular shield conductor supported around said container member except for said front end portion to allow visual observation of the interior of said container member through said front end portion, said shield conductor having a cap portion which makes a gas-tight seal with the rear end of said container member to close said unrestricted opening and to form a gas-tight container with said container member;

a support member attached to said cap portion of said shield conductor inside said container to support the other end of said resistance element in insulated relationship to said shield conductor;

a coaxial cable connector secured through a hermetic seal in said cap portion, including an outer conductor connected to said shield conductor and an inner conductor connected to said other end of said resistance element;

a bell-shaped arcing shield positioned around said one end of said resistance element with the smaller end of said shield member adjacent the front end of said container member;

a capacitance element, including an annular metal ring supported around said resistance element by a pair of metal strips which are secured at one end to said ring and at their other end to said support member and extend along opposite sides of said resistance element with the spacing between said resistance element and said strips decreasing with distance from said ring to said support member so that the capacitance between said element and said strips increases with said distance;

a charge of dielectric fluid in said container, said fluid being under pressure greater than atmospheric pressure so that a portion of said fluid is a gas and another portion is a liquid at normal temperature to indicate the presence of dielectric fluid in said container; and a compensation circuit connected to the output of said inner conductor of said connector, for compensating the frequency response of the electrical probe formed by the previously recited members to produce an output signal from said probe apparatus having a waveform which is an accurate reproduction of that of an input signal applied to said probe trip over a wide range of frequencies.

References Cited by the Examiner

UNITED STATES PATENTS

| | | | |
|---|---|---|---|
| 2,432,568 | 12/1947 | Gambitta | 174—11 |
| 2,641,630 | 6/1953 | Goldberger | 324—72.5 |
| 2,835,725 | 5/1958 | Nicholas | 174—73.1 X |
| 2,883,619 | 4/1959 | Kobbe | 324—72.5 |
| 3,055,968 | 9/1962 | Spiece | 174—31 |
| 3,101,386 | 8/1963 | Cronin et al. | 174—11.3 |

WALTER L. CARLSON, *Primary Examiner.*

E. L. STOLARUN, *Assistant Examiner.*